US007734400B2

(12) United States Patent
Gayme et al.

(10) Patent No.: US 7,734,400 B2
(45) Date of Patent: Jun. 8, 2010

(54) FAULT DETECTION SYSTEM AND METHOD USING AUGMENTED DATA AND FUZZY LOGIC

(75) Inventors: Dennice F. Gayme, Pasadena, CA (US); Sunil K. Menon, Golden Valley, MN (US); Emmanuel O. Nwadiogbu, Scottsdale, AZ (US); Dale W. Mukavetz, Chandler, AZ (US); Charles M. Ball, Gilbert, AZ (US)

(73) Assignee: Honeywell International Inc., Morristown, NJ (US)

( * ) Notice: Subject to any disclaimer, the term of this patent is extended or adjusted under 35 U.S.C. 154(b) by 1172 days.

(21) Appl. No.: 10/628,085

(22) Filed: Jul. 24, 2003

(65) Prior Publication Data

US 2005/0021212 A1     Jan. 27, 2005

(51) Int. Cl.
    *G06F 19/00* (2006.01)
(52) U.S. Cl. .......................... 701/54; 701/100; 701/57; 318/564
(58) Field of Classification Search ................ 701/100, 701/54, 106, 107, 34, 29, 57; 318/564, 565; 706/900, 52, 54, 1, 7, 8; 60/39.75; 702/144, 702/127, 184, 113, 185; 477/30
See application file for complete search history.

(56) References Cited

U.S. PATENT DOCUMENTS

| | | | | |
|---|---|---|---|---|
| 5,377,112 A | * | 12/1994 | Brown et al. | 701/115 |
| 5,406,787 A | * | 4/1995 | Terrier | 60/204 |
| 5,718,111 A | * | 2/1998 | Ling et al. | 60/778 |
| 5,961,314 A | * | 10/1999 | Myhre et al. | 431/79 |
| 6,073,262 A | * | 6/2000 | Larkin et al. | 714/736 |
| 6,098,011 A | * | 8/2000 | Scott | 701/100 |
| 6,289,274 B1 | * | 9/2001 | Martucci et al. | 701/100 |
| 6,301,572 B1 | * | 10/2001 | Harrison | 706/52 |
| 6,415,276 B1 | * | 7/2002 | Heger et al. | 706/52 |
| 6,636,819 B1 | * | 10/2003 | Abbott et al. | 702/96 |
| 6,675,639 B1 | * | 1/2004 | Schricker et al. | 73/118.1 |
| 6,757,641 B1 | * | 6/2004 | Immer et al. | 702/194 |
| 6,804,600 B1 | * | 10/2004 | Uluyol et al. | 701/100 |
| 6,868,319 B2 | * | 3/2005 | Kipersztok et al. | 701/29 |
| 6,898,469 B2 | * | 5/2005 | Bickford | 700/30 |
| 2003/0139860 A1 | * | 7/2003 | McBrien et al. | 701/34 |

OTHER PUBLICATIONS

Webster disctionary page.*
Wikipedia encyclopedia pa.*
Wikipedia document "A".*
Wikipedia document "B".*
Wikipedia document "C".*

* cited by examiner

*Primary Examiner*—Khoi H. Tran
*Assistant Examiner*—Ronnie Mancho
(74) *Attorney, Agent, or Firm*—Ingrassia Fisher & Lorenz, P.C.

(57) ABSTRACT

A system and method that provides improved fault detection in turbine engines is disclosed. The fault detection system provides the ability to detect symptoms of engine faults based on a relatively limited number of engine parameters that are sampled relatively infrequently. The fault detection system includes a sensor data processor that receives engine sensor data during operation and augments the sensor data. The augmented data set is passed to a fuzzy logic inference system that determines the likelihood that a fault has occurred. The inference system output can then be passed to a diagnostic system where evaluation of the output may yield a detailed diagnostic result and a prediction horizon.

20 Claims, 12 Drawing Sheets

| LEVEL | FUNCTION | ΔN2 | ΔN2dot | DESCRIPTION |
|---|---|---|---|---|
| LOW | SIGMOID | -20<br>-0.375 | -1350<br>-0.003 | SLOPE, FUNCTION MIDPOINT |
| MEDIUM | TRAPEZOID | -0.3<br>-0.2<br>0.2<br>0.3 | -0.0025<br>-0.001<br>0.001<br>0.0025 | MIN X INTERCEPT<br>MIN FLAT TOP<br>MAX FLAT TOP<br>MAX X INTERCEPT |
| HIGH | SIGMOID | 20<br>0.375 | 1350<br>0.003 | SLOPE, FUNCTION MIDPOINT |

| LEVEL | FUNCTION | ΔEGT | ΔEGTdot | DESCRIPTION |
|---|---|---|---|---|
| LOW | SIGMOID | -1.25<br>-20 | -50<br>-0.40 | SLOPE, FUNCTION MIDPOINT |
| MEDIUM | TRAPEZOID | -20<br>-10<br>10<br>20 | -0.035<br>-0.015<br>0.15<br>0.035 | MIN X INTERCEPT<br>MIN FLAT TOP<br>MAX FLAT TOP<br>MAX X INTERCEPT |
| HIGH | SIGMOID | 1.25<br>20 | 50<br>0.04 | SLOPE, FUNCTION MIDPOINT |

FIG. 7

| LEVEL | FUNCTION | ΔWE | ΔWFdot | DESCRIPTION |
|---|---|---|---|---|
| LOW | SIGMOID | -6<br>-0.8 | -775<br>-0.0045 | SLOPE, FUNCTION MIDPOINT |
| MEDIUM | TRAPEZOID | -1<br>-0.5<br>0.5<br>1 | -0.0015<br>-0.00105<br>0.00105<br>0.0015 | MIN X INTERCEPT<br>MIN FLAT TOP<br>MAX FLAT TOP<br>MAX X INTERCEPT |
| HIGH | SIGMOID | 6<br>0.8 | 775<br>0.0045 | SLOPE, FUNCTION MIDPOINT |

| LEVEL | FUNCTION | EGT MARGIN | DESCRIPTION |
|---|---|---|---|
| LOW | SIGMOID | -0.75<br>2.5 | SLOPE, FUNCTION MIDPOINT |
| MEDIUM | TRAPEZOID | 5<br>7.5<br>15<br>17.5 | MIN X INTERCEPT<br>MIN FLAT TOP<br>MAX FLAT TOP<br>MAX X INTERCEPT |
| HIGH | SIGMOID | 0.75<br>20 | SLOPE, FUNCTION MIDPOINT |

| | |
|---|---|
| RULE 1 | (N2 = low) & (EGT = high) & (WF = high) & (ΔN2dot = low) & (ΔEGTdot = high) & (ΔWFdot = high) & (EGTMargin = low) => (HPSpool = high) |
| RULE 2 | (N2 = high) & (EGT = high) & (WF = high) & (ΔN2dot = high) & (ΔEGTdot = high) & (ΔWFdot = high) => (HPSpool = low) |
| RULE 3 | (N2 = medium) & (EGT = medium) & (WF = medium) & (ΔN2dot = medium) & (ΔEGTdot = medium) & (ΔWFdot = medium) & (EGTMargin = high) => (HPSpool = low) |
| RULE 4 | (N2 = low) & (EGT = high) & (WF = high) & (ΔN2dot = low) & (ΔEGTdot = low) & (ΔWFdot = medium) & (EGTMargin = low) => (HPSpool = high) |
| RULE 5 | (N2 = low) & (EGT = high) & (WF = high) & (ΔN2dot = low) & (ΔEGTdot = low) & (EGTMargin = low) => (HPSpool = high) |
| RULE 6 | (N2 = low) & (EGT = high) & (WF = high) & (EGTMargin = low) => (HPSpool = high) |
| RULE 7 | (N2 = low) & (EGT = high) & (WF = high) & (ΔN2dot = low) & (ΔEGTdot = high) & (EGTMargin = medium) => (HPSpool = medium) |

FIG. 10

FAULT DETECTION SYSTEM AND METHOD USING AUGMENTED DATA AND FUZZY LOGIC

FIELD OF THE INVENTION

This invention generally relates to diagnostic systems, and more specifically relates to fault detection in turbine engine systems.

BACKGROUND OF THE INVENTION

Modern aircraft are increasingly complex. The complexities of these aircraft have led to an increasing need for automated fault detection systems. These fault detection systems are designed to monitor the various systems of the aircraft in an effort to detect potential faults. These systems are designed to detect these potential faults such that the potential faults can be addressed before the potential faults lead to serious system failure and possible in-flight shutdowns, take-off aborts, delays or cancellations.

Engines are, of course, a particularly critical part of the aircraft. As such, fault detection for aircraft engines are an important part of an aircraft's fault detection system. Traditional engine fault detection in turbine engines has suffered from significant limitations in terms of the type of data they are designed to make use of and their performance. For example, many of the previous approaches have been developed and tested using models. Typically, these models produce data that is well behaved and sampled at regular intervals. Engine data is then compared to the models as part of a fault detection system.

Unfortunately, in many actual field applications, the engine data is neither well behaved nor measured at regular intervals. Noisy data measured at uneven intervals can be present in the systems when engine data is collected manually by the pilot or in automatic data acquisition systems. These data problems can result in large parameter variations on a flight to flight basis. The problem is exacerbated in many older data acquisition systems where a very limited amount of data is recorded per flight (with one data point per flight being the norm) and the data is often recorded under a fixed set of engine operating conditions.

The noisy and limited data sets can cause several complications for automated engine monitoring and diagnosis. First, many engine problems are not distinguishable or even visible within small sets of recorded parameters. Second, the standard deviation over the flight to flight data points for a normally operating engine may be larger than the distance between the mean of the data associated with the normal condition and the mean of the data associated with the faulty engine condition. Furthermore, having data recorded only under a specific set of operating conditions may result in large data gaps. This results in a compromised ability to detect faults in the turbine engine system.

Thus, what is needed is an improved system and method for detecting engine faults that occur in a wide variety of operating conditions, which can also consistently detect engine faults from limited and sometimes noisy engine data sets.

BRIEF SUMMARY OF THE INVENTION

The present invention provides a fault detection system and method that provides improved performance over previous techniques. The fault detection system provides the ability to detect symptoms of engine faults based on a relatively limited number of engine parameters that are sampled relatively infrequently. The fault detection system includes a sensor data processor that receives engine sensor data during operation and augments the sensor data. The augmented data set is passed to a fuzzy logic inference system that determines the likelihood that a fault as occurred. The inference system output can then be passed to a diagnostic system where evaluation of the output may yield a detailed diagnostic results and a prediction horizon.

The sensor data processor augments the sensor data by determining residuals of the sensor data, the rate of change of those residuals and other derived parameters. The residuals and rate of change of residuals are applied to the fuzzy logic inference system where they are compared against a set of fuzzy logic rules. Augmenting the sensor data before passing it to the fuzzy logic inference system improves the predictive horizon of the fault detection system. Specifically, the augmented data set improves the robustness of the fault detection system in the presence of varying levels of sensor noise and sensor measurement error.

The foregoing and other objects, features and advantages of the invention will be apparent from the following more particular description of a preferred embodiment of the invention, as illustrated in the accompanying drawings.

BRIEF DESCRIPTION OF DRAWINGS

The preferred exemplary embodiment of the present invention will hereinafter be described in conjunction with the appended drawings, where like designations denote like elements, and:

FIGS. 6-9 are table views of exemplary membership function parameters;

FIG. 10 is a table view of exemplary fuzzy logic rules;

DETAILED DESCRIPTION OF THE INVENTION

The present invention provides a fault detection system and method that provides improved performance over previous techniques. The fault detection system provides the ability to detect symptoms of engine faults based on a relatively limited number of engine parameters that are sampled relatively infrequently. The fault detection system includes a sensor data processor that receives engine sensor data during operation and augments the sensor data. The augmented data set is passed to a fuzzy logic inference system that determines the likelihood that a fault has occurred or is incipient. The inference system output can then be passed to a diagnostic system where further evaluation of the output may yield detailed diagnostic results and a prediction horizon.

Figure 1:
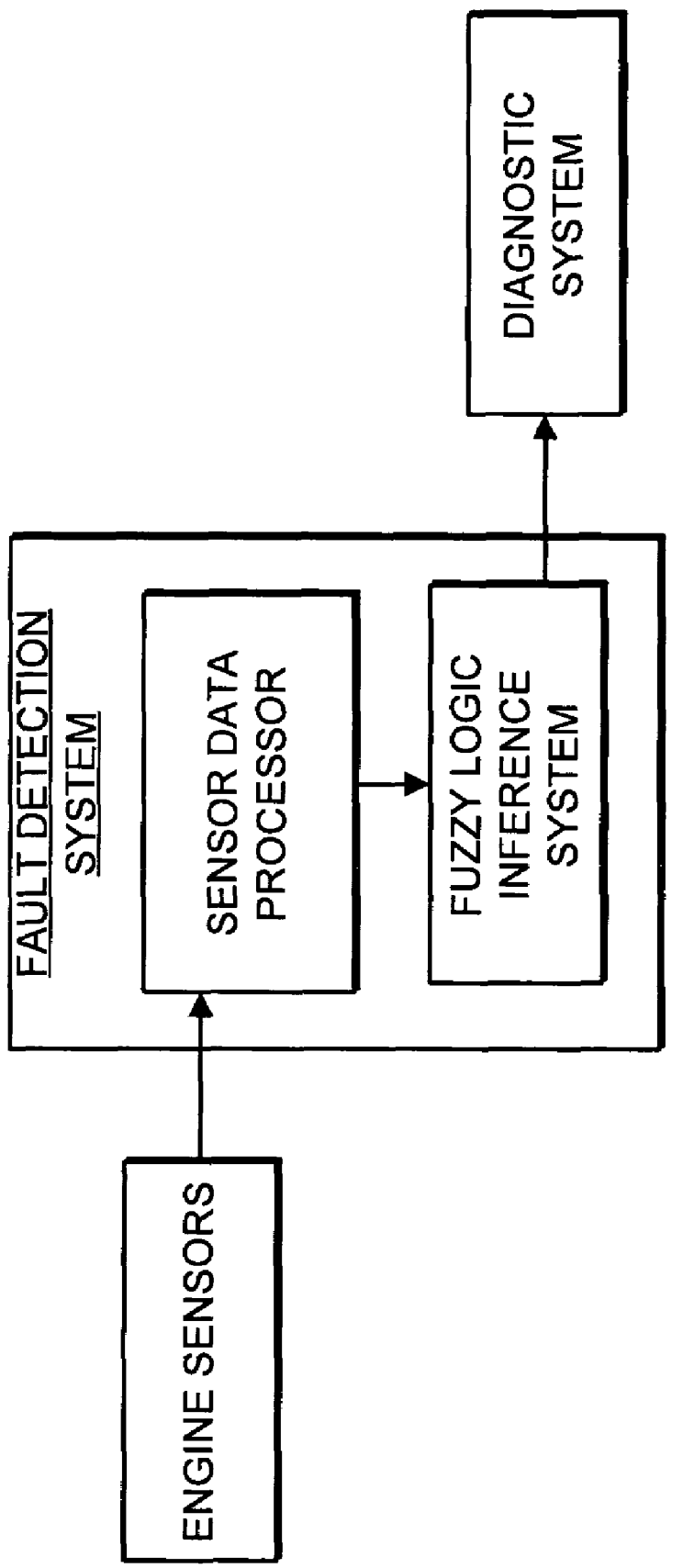
FIG. 1 is a schematic view of a fault detection system.

Turning now to FIG. 1, a fault detection system 100 for engine systems is illustrated. The fault detection system 100 includes a sensor data processor and a fuzzy logic inference system. Turbine engine sensor data is measured and passed to the sensor data processor. The sensor data processor receives the engine sensor data and augments the sensor data. The sensor data processor can augment the sensor data using various methods, including determining residuals of the sensor data the rate of change of those residuals. The augmented data set is then passed to a fuzzy logic inference system that determines the likelihood that a fault as occurred or is incipient.

The fuzzy logic inference system determines the likelihood that a fault has occurred by performing a fuzzy logic analysis of the augmented data set. The fuzzy logic analysis generally includes fuzzifying the augmented data set into membership functions to classify the augmented data set. This can include fuzzifying the residuals and the rate of change of the residuals, and any other derived parameters appropriate for diagnosis of a particular fault of interest into a set of membership functions to classify the augmented data set. The fuzzified data set is analyzed against a set of fuzzy logic rules. The output of the fuzzy logic rules analysis is generated and passed to a diagnostic system where the likelihood of a fault in the turbine engine is determined. Faults detected by the diagnostic system are then notified to the system users.

As will become clear, augmenting the sensor data before passing it to the fuzzy logic inference system improves the predictive horizon of the fault detection system. Specifically, the augmented data set improves the robustness of the fault detection system in the presence of varying levels of sensor noise and sensor measurement error.

Figure 2:
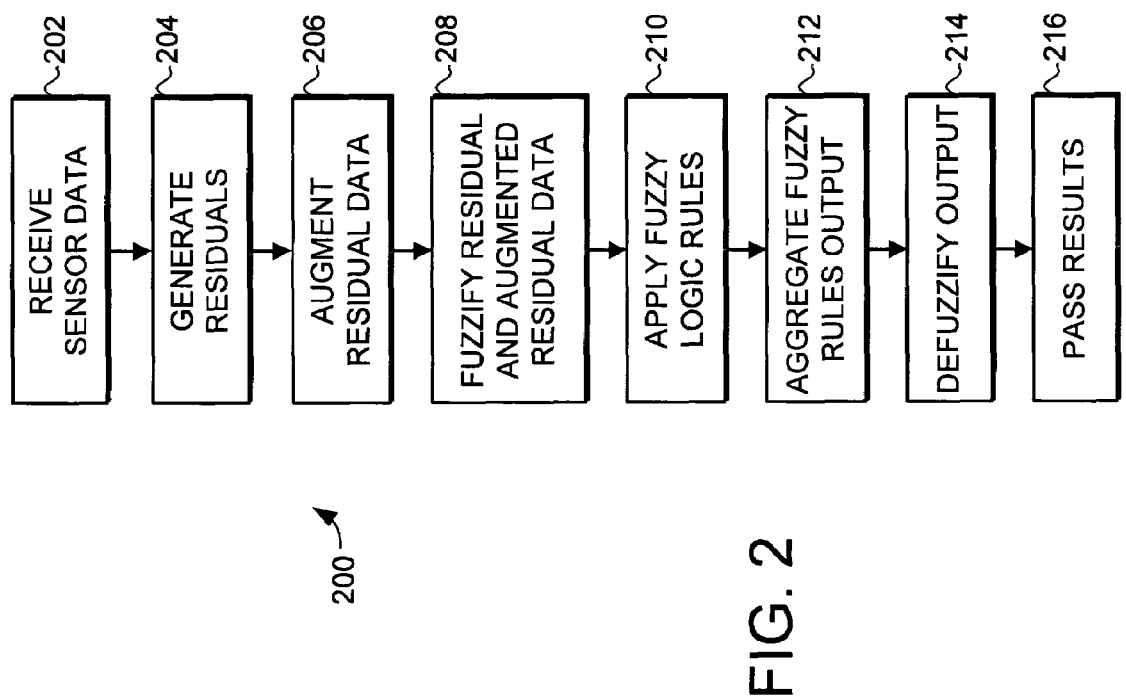
FIG. 2 is a flow diagram illustrating a fault detection method.

Turning now to FIG. 2, a method 200 for fault diagnosis in a turbine engine is illustrated. Method 200 lists the general steps that can be performed in a fault diagnosis method using the embodiments of the present invention. The first step 202 is to receive sensor data from the turbine engine, with the sensor data providing the basis for the analysis and fault detection. The next step 204 is to generate residuals from the sensor data. Generating residuals can be accomplished using a variety of techniques, such as by comparing the sensor data to expected values and determining the residual difference. The next step 206 is to augment the residual data. The residual data can be augmented using a variety of techniques, such as by determining the rate of change of residual data or determining margin levels. The next step 208 is to fuzyify the augmented data set. The augmented data set can be fuzzified using a plurality of membership functions, with the data mapped into the membership functions as a technique to classify the data. The next step 210 is to apply fuzzy logic rules to the fuzzified sensor data. The fuzzy logic rules define relational rules between variables that imply certain outputs. The next step 212 is to aggregate the output of the fuzzy rules. The next step 214 is to defuzzify the logic rule output to generate an output that is indicative of the likelihood of an engine fault based on the sensor data. Steps 212 and 214 can be used to generate this likelihood in a variety of ways, such as by adding the results of each of the rules and finding the centroid or bisection of the resulting function. The next step 216 is to pass the results to a diagnostic system to fully interpret the results and pass the diagnostic information to the diagnostic system for output to the user of interest.

Figure 3:
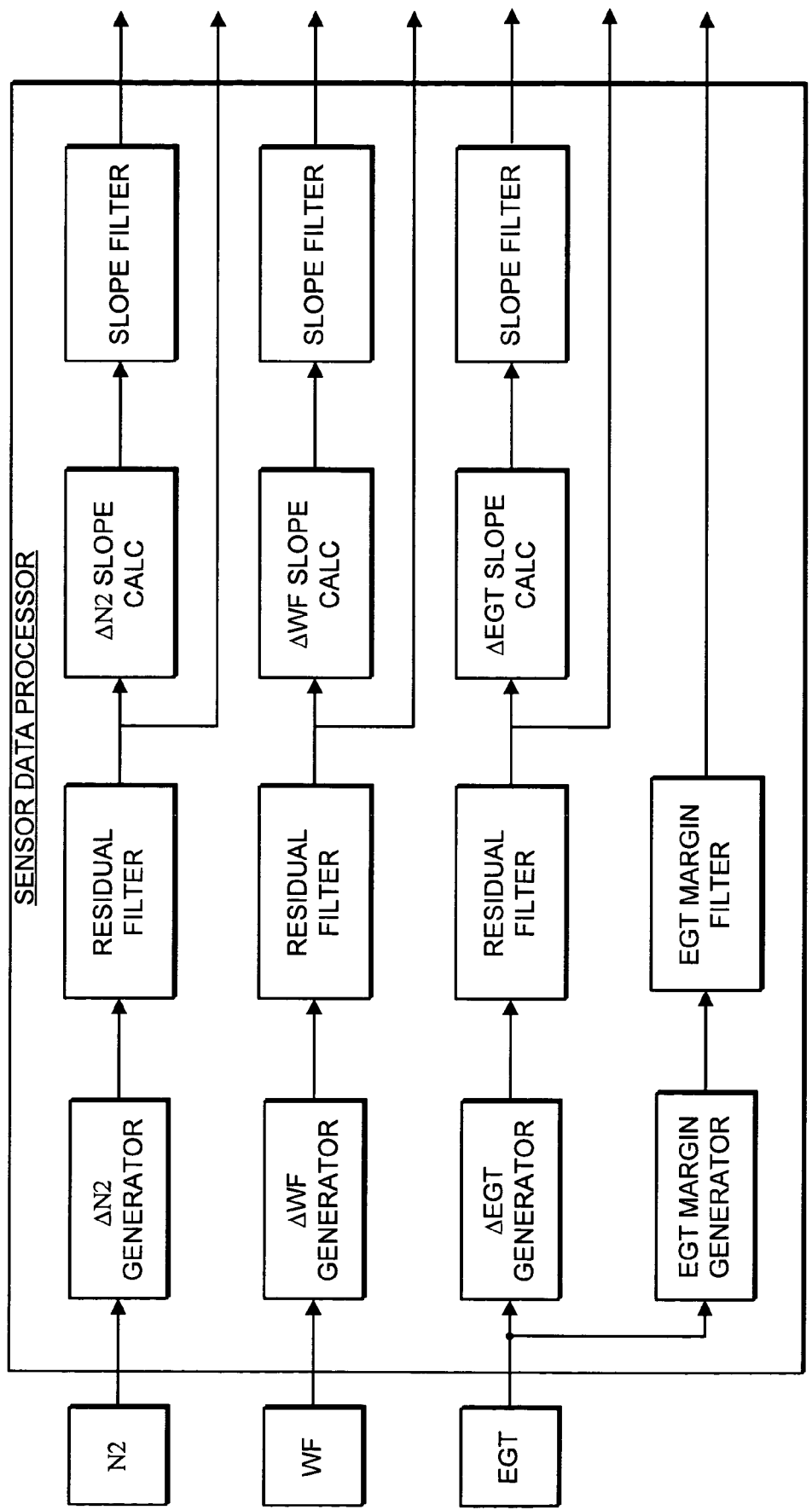
FIG. 3 is a schematic view of a exemplary embodiment sensor data processor.

Turning now to FIG. 3, a more detailed view of an exemplary sensor data processor 300 is illustrated. The sensor data processor 300 receives engine sensor data and augments the sensor data to create an augmented data set, and passes the augmented data set to a fuzzy logic inference system. The sensor data processor 300 includes residual generators, residual filters, slope calculators, slope filters a margin generator and a margin filter. It should be noted that the example of FIG. 3 is just one possible implementation of a sensor data processor, and that other implementations that include more or less processing to the sensor data can be used.

In the example illustrated in FIG. 3, the engine sensor data received by the sensor data processor 300 includes engine speed (N2), fuel flow (WF) and exhaust gas temperature (EGT). The engine speed (N2), fuel flow (WF) and exhaust gas temperature (EGT) are processed and augmented to generate a filtered residual sensor data and filtered residual slope data for each of these data types, which is then passed to the fuzzy logic inference system. In addition to this, EGT margin data is generated, filtered and then passed to the fuzzy logic inference system. The filtered residual sensor data, filtered residual slope data and filtered EGT margin data is then used by fuzzy logic inference system to detect the likelihood of fault in the engine.

Specifically, the sensor data processor receives the N2, WF, and EGT sensor data and passes that data to a series of residual generators. In particular, the N2 sensor data is passed to a $\Delta$N2 Generator that compares the measured N2 sensor data to expected values and determines the residual difference. Likewise, the WF and EGT sensor data are passed to a $\Delta$WF and $\Delta$EGT Generators that compares the WF and EGT data to expected values and determine residual differences. The expected values for each of the measured values can be generated in a plurality of ways. All of the methods generally involve some type of engine model that represents some relationship between the engine core speed (N1), ambient conditions and the measured values N2, EGT and WF. This model can be either physics based or empirical in nature but in the most simple terms can be a function $Y_i=F_i(N1, \text{ambient\_conditions})$ where i is N2, EGT or WF. There are many other well known techniques for generating residuals for the engine parameters of interest and any one which produces results of adequate precision may be used.

The created residuals $\Delta$N2, $\Delta$WF and $\Delta$EGT are each passed to a corresponding residual filter. The residual filters are preferably low pass filters that serve to eliminate noise and outliers in the residuals. Any suitable technique can be used to filter the residuals. One suitable technique that can be used a Butterworth filter. A Butterworth filter is a low pass filter that has a monotonic amplitude frequency response that is maximally flat a band pass frequencies. The Butterworth filter has a frequency response that decreases logarithmically with increasing frequency. Additionally, the Butterworth filter also has minimal phase shift of the filter's band pass when compared to other conventional filters.

In one further refinement, the Butterworth filter can comprise a third order Butterworth filter. A third order filter has the advantage of reducing the window of data required to compute the filtered values because the window size directly increases the number of points before the first diagnostic output is generated. Of course, the order of the filter may be increased when more aggressive filtering is desirable due to increased sensor data noise.

Again, other filter techniques can be used, including simpler methods such as rolling averages. The low pass filtering operation thus smoothes the engine sensor data and decreases the effects of noise in the measurement channels.

The filtered residual sensor data is then passed to corresponding slope calculators. The slope calculators augment the filtered residuals by determining the rate of change the sensor data. Augmenting the filtered sensor data by determining the slope of the sensor data improves the predictive horizon of the fault detection system and improves the robustness of the system to the presence of sensor noise and sensor measurement error. Specifically, the slopes of the filtered residual sensor data can indicate cases where an increase or decrease in the parameter of interested happened at a faster rate. This is especially indicative for the many types of engine failures that tend to have a substantial time horizon. In these cases, a sharp increase in the rate of change of the residuals is often a leading indicator of failure. Using the rate of change and change in the residual sensor data compared to the baseline performance allows for a less aggress fault detection threshold and facilitates the ability to generate a better time horizon estimate for the fault detection system.

Specifically, the filtered $\Delta N2$ residual is passed to a $\Delta N2$ slope calculator, the filtered $\Delta WF$ residual is passed to a $\Delta WF$ slope calculator, and the filtered $\Delta EGT$ residual is passed to a $\Delta EGT$ slope calculator. Each slope calculator determines the rate of change for its corresponding filtered residual. The rate of change of each of these sensor data types can be calculated in any suitable manner.

Generally, it is not practical to directly calculate the derivative of the residuals directly because of possible non-uniformity in the sampling rate of the sensor data. As such, one suitable method of calculating the slope is to use a linear fit method. The linear fit method calculates the linear fit of the last N samples of the filtered data, where N is an empirically obtained value. In general, it is desirable to minimize the number of points used to calculate the slopes because the number of points required to generate the slope values directly influences the number of points that it takes to get the first algorithm output. In applications where the fault may be caused by an installation problem or develop quite rapidly it is very desirable to have the predictions available as soon as possible. Thus, the number N is preferably chosen empirically based on a determination of the minimum number of points that can be used in the slope calculation to maintain good performance of the fuzzy logic based fault detection system.

The slope data generated by the slope calculators is then passed to a set of slope filters. Specifically, the $\Delta N2$ slope, $\Delta WF$ slope and $\Delta EGT$ slope data is each passed to a corresponding slope filter. Like the residual filters, the slope filters are preferably low pass filters that serve to eliminate noise and outliers in the data. Other derived parameters may also be filtered depending on how much noise is present in the corresponding signal. For the slopes and any other derived parameter filtering can be accomplished using any suitable low pass filtering technique, and again one suitable technique that can be used is a third order Butterworth filter.

The filtered slope data, along with the filtered residual data is outputted to the fuzzy logic inference system. In addition to these data sets, additional data sets can be passed to the fuzzy logic inference system. In the illustrated embodiment, EGT margin data is also generated, filtered and then and passed to the fuzzy logic inference system. The calculation of the EGT margin provides another member of the augmented data set that can be used as an input parameter for the fuzzy inference system. Again, this is just one example of an additional input parameter that can be used, and any other parameter that can be derived from the measured engine data and is suitable for use in a diagnostic system may be used as part of the input set.

The EGT margin represents the amount of temperature margin left in the engine. Thus, the EGT margin represents the number of degrees between the current operating conditions and the temperature redline for that particular engine model. The engine's redline is generally a safety limit on temperature for the engine's operation. If the engine crosses the redline during operation, is should be removed and sent for evaluation and repair.

In general, the EGT margin can be calculated using the current operating conditions and the current EGT along with a model of the engine to estimate the temperature that the engine would attain given extreme atmospheric conditions and maximum thrust available. This number is then subtracted from the redline temperature to determine the remaining EGT margin. Other derived parameters such as the limits associated with bleed air loss and outside air temperature may also be used in a similar manner to EGT Margin. However the slopes of these parameters in conjunction with the other inputs and the fuzzy inference system provide a much better diagnosis system capability in terms of the prediction horizon (time to failure) for the fault modes of interest.

Using the EGT margin facilitates the elimination of effects caused by engine-to-engine variation because it indicates the absolute performance of the engine from a temperature perspective. The $\Delta EGT$ parameter, on the other hand, is always compared to the baseline of each engine's performance, which may vary substantially from engine to engine. The EGT margin is generally not sufficient alone as a performance indicator, as it does not always operate at extreme conditions. Additionally, the EGT margin decreases at similar amounts for several different types of engine failure modes such as EGT sensor failure, external air leakage, fuel system problems and performance problems associated with both the high speed (pressure) and low speed (pressure) engine shafts. Patterns of deterioration in other parameters such as residuals and the rate of change of residuals coupled with EGT margin is a more complete measure of performance. Such a combined system is the subject of the preferred embodiment of the current invention.

Thus, the sensor data processor 300 receives engine speed (N2), fuel flow (WF) and exhaust gas temperature (EGT) data, and processes and augments the sensor data to generate a filtered residual sensor data and filtered residual slope data for each of these data types, which is then passed to the fuzzy logic inference system. The sensor data processor 300 also generates EGT margin data and passes it to the fuzzy logic inference system.

It should again be noted that this is just one exemplary implementation of a sensor data processor and the augmented data set created. For example, different sets of data may be used in addition to or instead of the engine core speed, fuel flow, and EGT data. Other types include engine fan speed, bleed air pressure, fuel temperature, oil temperature, fuel pressure, oil pressure and compressor discharge pressure. As another example, some embodiments may forgo the generation of EGT margin data. Likewise, other embodiments may generate additional parameters such as the rate of change of EGT margin, the outside air temperature limit, the slope of the outside air temperature limit, or other parameters associated with particular faults of interest.

Figure 4:
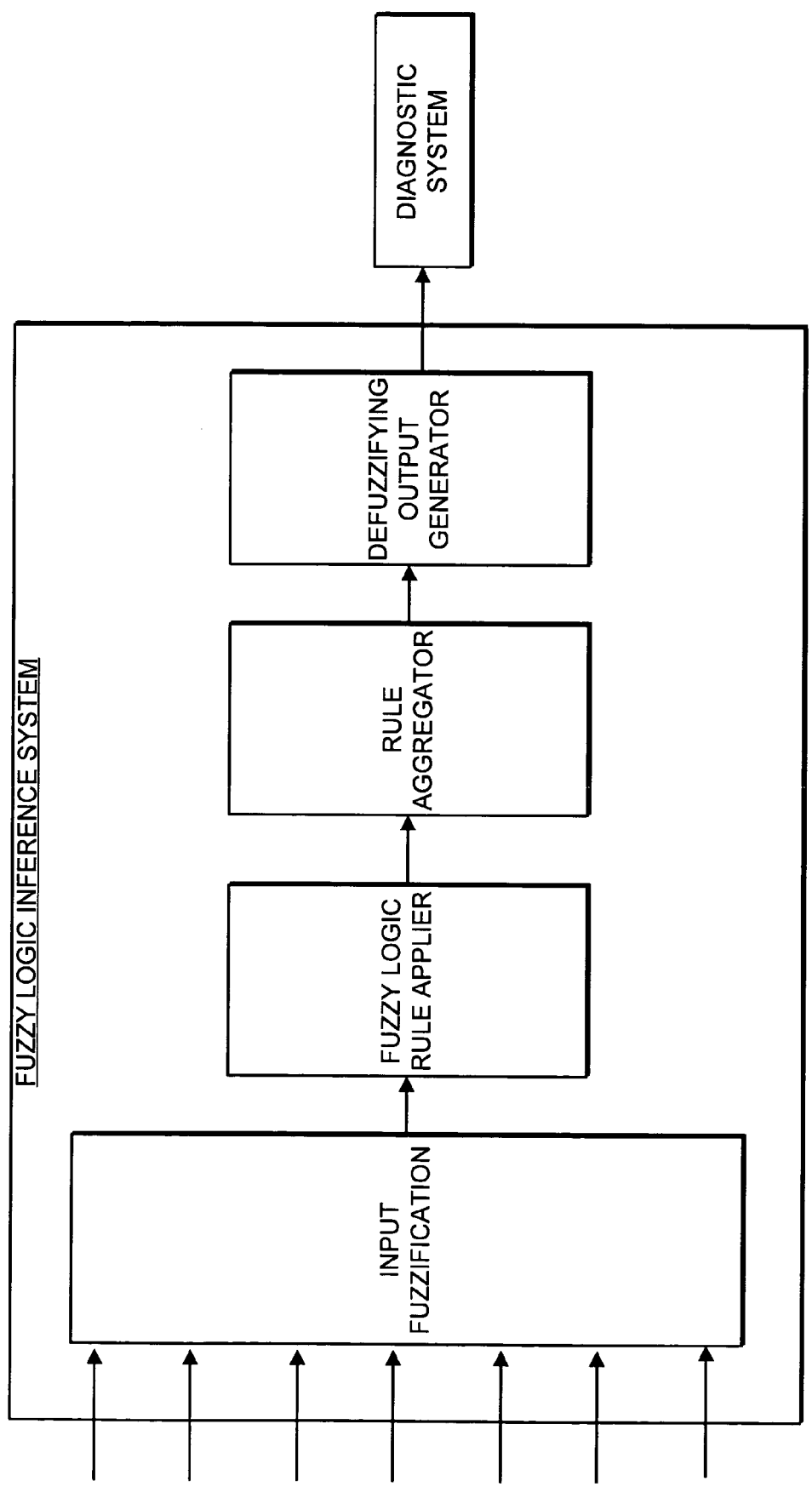
FIG. 4 is a schematic view of an exemplary embodiment fuzzy logic inference system.

Turning now to FIG. 4, a more detailed view of an exemplary fuzzy logic inference system 350 is illustrated. The fuzzy logic inference system 350 receives the augmented data set from the sensor data processor and determines the likelihood that a fault has occurred. The inference system output can then be passed to diagnostic system where evaluation of the output may yield a detailed diagnostic results and a prediction horizon.

The fuzzy logic inference system can be implemented using many different techniques and methods. In general, fuzzy logic systems typically use a nonlinear input-output mapping of a vector of features into a scalar result. Fuzzy logic systems that use these techniques are generally regarded as proficient at translating expert system insight into a mathematical formulation. This ability to handle imprecision of input and output variables directly by defining them as fuzzy sets, which can be described using linguistic variables, makes fuzzy logic a good method for handling system uncertainty. It is also well suited for use with systems where the inputs are comprised of sets lacking clear crisp boundaries.

Typically, fuzzy logic systems use a mapping of a multidimensional input space $V \in R^n$ into a single dimensional output space $W \in R$. This mapping typically is performed using four basic steps: fuzzification of the inputs, application of the rules, aggregation of consequences across the rules, and defuzzification.

In the implementation illustrated in FIG. 4, the fuzzy logic inference system 350 includes an input fuzzification element, a fuzzy logic rule applier, a rule aggregator and a defuzzification output generator. The fuzzy input fuzzification element receives the augmented data set from the sensor data processor and fuzzifies the augmented data set using the plurality of membership functions to classify the data The fuzzified data set is then passed to the fuzzy logic rule applier. The fuzzy logic rules applier applies the fuzzy rules to the fuzzified data set. The outputs of the applied fuzzy rules are passed to the rule aggregator. The rule aggregator combines the functional outputs from each of the rules to generate an aggregated function. The aggregated function is passed to the defizzification output generator that defuzzifies the aggregated function to generate a single number that is indicative of the likelihood of an engine fault based on the sensor data.

The fuzzy input fuzzification element receives the augmented data set from the sensor data processor and fuzzifies the augmented data set into a plurality of membership functions. The basis of the fuzzy logic is the concept of a fuzzy set, which is in terms of its membership function. A fuzzy set, in contrast to a traditional set, allows many degrees of membership. The degree of membership to a fuzzy set can be indicated as a number between 0 and 1. Membership in the fuzzy set can be defined with an appropriate membership function. As one example, membership in the fuzzy set can be defined with a membership function $\mu_A(x)$ that includes every number between 0 and 1. Thus, the membership function maps every element in the universe of discourse X to the interval [0,1] such that $\mu_A(x): X \rightarrow [0,1]$. This process of mapping data into the membership function is commonly referred to as fuzzifying the data. For a full description of the mathematics of fuzzy sets see Zadeh, L. A., *Fuzzy Sets*, Inf. Control 8(3), 338-353, 1965.

Thus, the input fuzzification element receives the augmented data set from the sensor data processor and maps or fuzzifies the augmented data set using one or more membership functions. The membership functions used to fuzzify the augmented data set may be defined based on intuitive groupings of test data or other mathematical methods, and may depend upon details of the engine system and the nature of the augmented data set.

In the one embodiment of the present invention membership functions can be defined based on expert heuristics governing the engine behavior in both normal and faulty modes of operation. These heuristics may typically include the rates and directions that each parameter would shift when the engine failed or began to deteriorate and the alert levels for each of the individual parameters, with the alert levels developed assuming that there were single parameter shifts in each direction at a predefined rate. Additionally, extensive studies of fault models and flight data from failed engines can be used to develop the levels and rates for multiple parameter shifts. A detailed description of several exemplary membership functions developed using these techniques will be discussed below.

The fuzzified augmented data set is then passed to the fuzzy logic rule applier. The fuzzy logic rule applier is used to apply the fuzzy rules to the fuzzy data set The fuzzy rules serve to combine the information in the membership functions and the inference engine then determines how the rules are aggregated. The rules in the fuzzy system are generally relational rules between variables that imply certain outputs. For example, if engine speed is low and fuel consumption is high, then engine performance is poor. The rules can be applied with or without weighting factors. Generally, the rules being used would be developed based on the expert heuristics that may have been used to manually trend engine behavior. Other rules associated with other engine faults can be added to help isolate one fault from another. Finally weighting can be applied to the rules so that the strongest data trends would dominate the detection system. The overall fuzzy inference system including the approach used to combine the fuzzy rules in this embodiment is widely referred to as the so-called Mamdani method. For further information on the Mamdani method, see Tsoukala, L. H. and R. E. Uhrig, *Fuzzy and Neural Approaches to Engineering*, John Wiley & Sons, Inc., N.Y., 1997. A detailed explanation of several exemplary fuzzy logic rules will be discussed below.

The outputs of the applied fuzzy rules are passed to the rule aggregator. The rule aggregator combines the functional outputs from each of the rules to generate an aggregated fuzzy set. After the rules are aggregated there is a function describing the space of the output.

This function created by the rule aggregator is not easily interpreted by the fault diagnosis system so it is passed the defuzzifying output generator for defuzzification. The process of defuzzification can be accomplished using a variety of techniques. One exemplary method is to defuzzify using a centroid method. The centroid method finds the centroid of the area under the aggregated function and assigns this value as the output. Defuzzification can also be accomplished using methods such as bisection, or maximum matching. For a description of these methods see Tsoukala.

The fuzzy logic inference system 350 can be implemented with a variety of tools and techniques. For example, the Fuzzy Logic Toolbox available for the MATLAB program from MathWorks Inc includes a variety of tools that can be used to implement a fuzzy logic inference system. Other possible implementations include using programs such as Mathmatica and Maple.

As stated above, the membership functions and fuzzy logic rules used in a particular fuzzy logic inference system would depend upon the details of the engine system and the nature of the likely faults that are being monitored for in the engine. As one detailed example of membership functions and fuzzy logic rules, a set of exemplary membership functions and fuzzy logic rules developed for high pressure spool deterioration fault detection will now be described. The main causes of high pressure spool inefficiency are high pressure compressor deterioration, high pressure turbine deterioration, or internal air leakage. The root causes of high pressure turbine problems are open tip clearances from blade rubs or blade leading edge erosion. High pressure turbine deterioration can also be caused by blade rubs or blade erosion and internal air leakage has a plurality of causes ranging from loose combustor bolts to other sealing failures.

The exemplary membership functions, and their associated fuzzy logic rules, were developed from multiple engines that had experienced high pressure spool deterioration. The example illustrates how the fuzzy logic inference system can be used to predict the failure of an engine before other factors, such as exceeding temperature safety limits, cause technicians to remove the engine.

In this example, the sensor data processor receives engine core speed data (N2), exhaust gas temperature data (EGT) and fuel flow data (WF). The sensor data processor uses the measured values to create several different data types. These data types include residual engine speed (ΔN2), residual engine speed slope (ΔN2dot), residual EGT (ΔEGT), residual EGT slope (ΔEGTdot), residual fuel flow (ΔWF), residual fuel flow slope (ΔWFdot), and EGT margin. It should again be noted that these parameters are not an exhaustive set and are meant only to serve as examples of the parameters that can be used to diagnose high pressure spool deterioration.

Figure 5A:
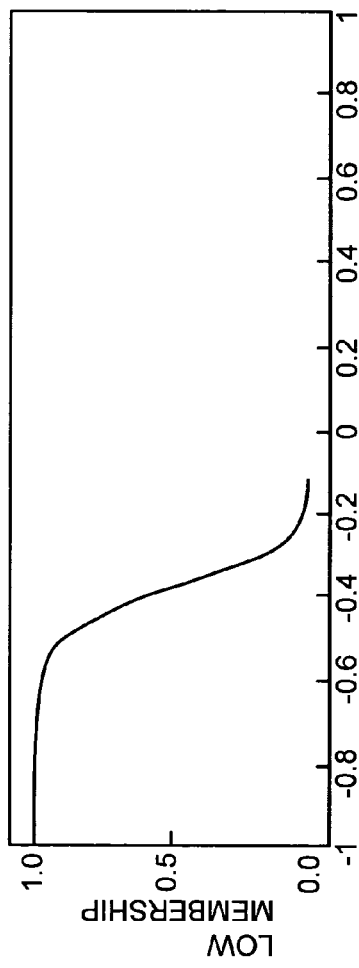
FIGS. 5a, 5b, and 5c are schematic views of exemplary membership functions.
Figure 5B:
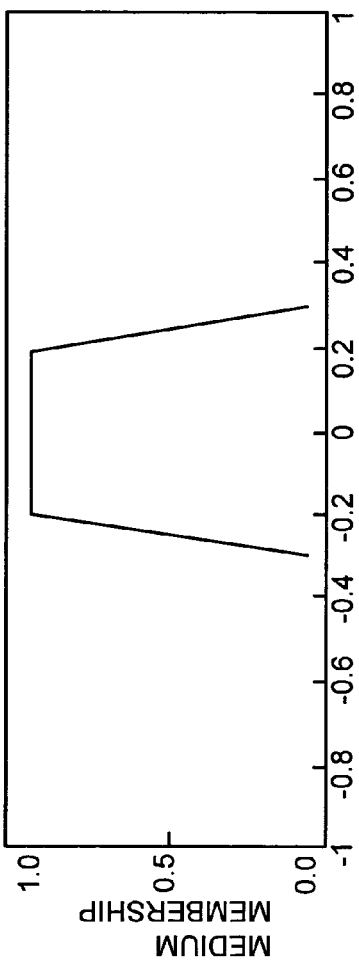
Figure 5C:
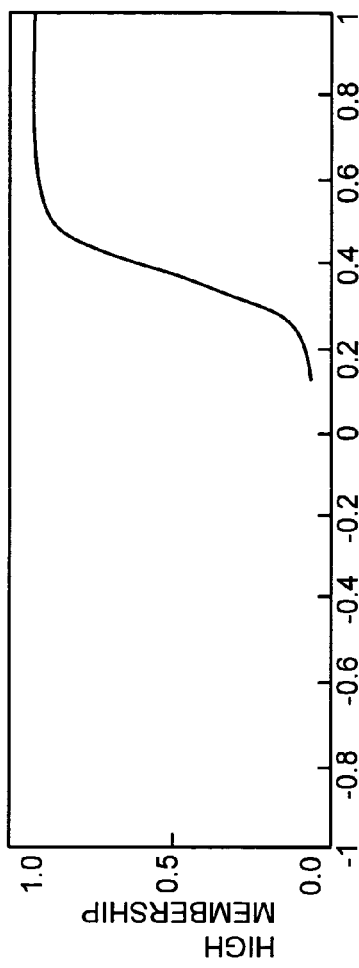

The exemplary membership functions were developed for classifying the above data types into high, medium and low ranges. Turning now to FIGS. 5a, 5b and 5c, exemplary membership functions for low membership, medium membership and high membership for ΔN2 are illustrated. Turning to FIG. 6, a table 600 describing the parameters values of the membership functions in FIG. 5 are given. Additionally included in table 600 are the parameters for membership functions corresponding to slope data, ΔN2dot. As seen in FIGS. 5 and 6, the low membership function and high membership functions are sigmoid, while the medium membership is trapezoid. The shape of the functions were defined to describe the transition from when a parameter was operating at one level to where it started operating at another level. These levels are generally obtained using expert defined performance limits for safe and effective operation of the engine. For example, when the ΔN2 parameter was described as medium and the engine was operating normally, the general shape of the transition from operating at this normal level to either a high or a low level was used to define the shape of the membership functions.

The membership functions for the other sensor data types in this example are similar, and their parameters are given in FIGS. 7, 8 and 9. Specifically, FIG. 7 illustrates a table 700 showing the parameters for a low, medium and high membership functions for ΔEGT and ΔEGTdot. Likewise, FIG. 8 illustrates a table 800 showing the parameters for low, medium and high membership functions for ΔWF and ΔWFdot. Finally, FIG. 9 illustrates a table 900 showing the parameters for low, medium and high membership functions for EGT margin. The membership functions derived for each input except EGT Margin are symmetric because all of the other alert levels for data are symmetric. Since EGT Margin is an absolute measure rather than a shift from a nominal value it is defined in terms of the levels generally seen during engine operation. Again, the levels and function types for each of the membership functions were determined from engine models and empirical data. The membership functions illustrated in FIGS. 5-9 are exemplary for use in detecting high pressure spool faults.

After fuzzification, the fuzzified augmented data set is applied to fuzzy logic rules. As one detailed example of fuzzy logic rules, a set of fuzzy logic rules developed for high pressure spool deterioration fault detection will now be described. The basic expert heuristics governing high pressure spool inefficiency are the magnitudes of the ΔN2 and ΔN2dot decrease, while ΔEGT, ΔEGTdot, ΔWF and ΔWFdot increase and EGT Margin approaches zero. Turning now to FIG. 10, a set of seven fuzzy rules are illustrated in table 1000. These rules were designed to be applied to the membership functions illustrated in FIGS. 5-9 and discussed above. The rules illustrated in table 10 are exemplary of the type of rules that could be used in a fuzzy logic rule applier as illustrated in FIG. 4.

The exemplary rules illustrated in table 1000 were developed using the basic expert heuristics described above. Rules 1 and 2 directly implement the expert heuristics, while rule 3 deals with the case of a normally operating engine. Rule 4 deals with the fact that the change in ΔWF lags the response in the other signals. Rule 7 is designed to deal with the fact that the fuel flow measurements tend to have the most noise in the measurement channel and therefore the ΔWFdot calculation is the least reliable. The other rules are designed to deal with the engine conditions that may mask either the fault of interest of normal operating conditions. For example an external air leak is similar to a high pressure performance fault in that ΔEGT, ΔEGTdot, ΔWF and ΔWFdot increase while EGT Margin approaches zero. However, in this case ΔN2 and ΔN2dot also increase so rule 2 makes sure that this condition yields a function describing a low likelihood of high pressure spool deterioration for aggregation with the other rules.

The fuzzy logic rule applier is thus used to apply the fuzzy rules to the fuzzy augmented data set. The fuzzy rules serve to combine the information in the membership functions and the inference engine. The rules in the fuzzy system are generally relational rules between variables that imply certain outputs.

The rule aggregator such as the one illustrated in FIG. 4 combines the applied fuzzy rule outputs to generate an aggregated output function. In the example of for high pressure spool failures illustrated in FIGS. 5-10 the rules can be combined using the following weighting scheme: 1*R1, 1*R2, 0.5*R3, 1*R4, 1*R5, 1*R6 and 0.5*R7, where R1-R7 are rules 1-7 respectively. The weighting combines the outputs of rules 1-7 to give one aggregated function that is indicative of a high pressure spool failure.

The aggregated output function is then passed to the defuzzifying output generator, such as the one illustrated in FIG. 4, to defuzzify and generate a single number that is indicative of the likelihood of an engine fault based on the sensor data. As one, the process of defuzzification is carried out using the centroid method. The centroid method finds the centroid of the area under the aggregated function and assigns this value as the output. Defuzification can also be done using method such as bisection or maximum matching. For a description of these methods see Tsoukala.

FIGS. 5-10 thus illustrate an exemplary fuzzy logic inference system that uses a defined set of membership functions and a set of seven fuzzy logic rules, that are combined to determine the likelihood of a high pressure spool fault based on engine speed, fuel flow, and EGT data. Again, this is just one example of how such a fuzzy logic system could be implemented, and other implementations using different sensor data sets, different membership sets, and/or different fuzzy logic rules could be developed for a wide variety of fault detection types.

Figure 11:
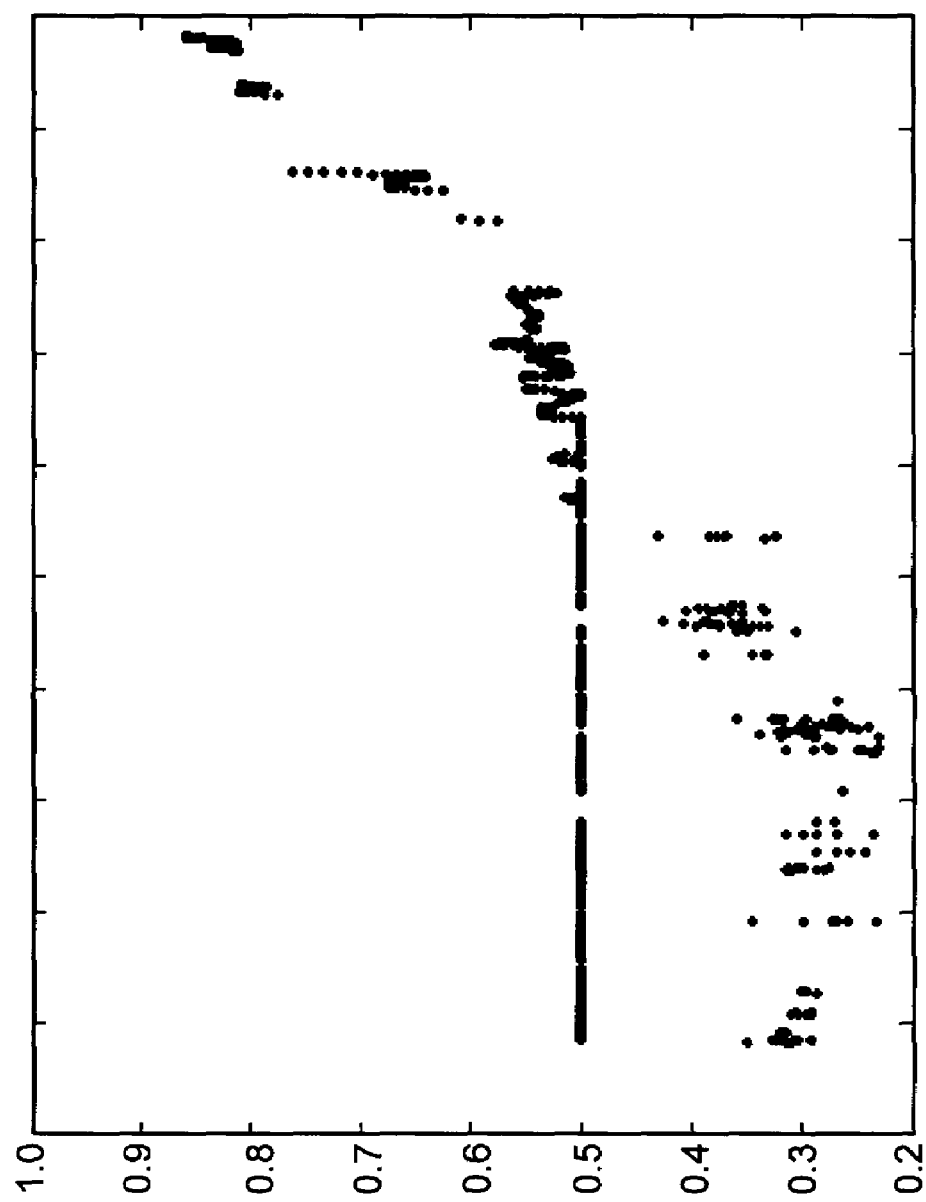
FIG. 11 is a graph view of test results for an exemplary fuzzy logic system.

Turning now to FIG. 11, a case study result for an exemplary fault detection system is illustrated in table 1100. In this table each point represents a flight for which data was recorded and the x-axis is in hours or operation. The time window presented on the x-axis of this figure represents about fifteen months of operation with about 1500 flight points. The y-axis is the fuzzy logic fault detection output generated by the fuzzy logic fault detection system described with reference to FIGS. 5-10. The fuzzy logic output fault detection output roughly corresponds to the likelihood of an engine failure, in this case, the likelihood that there is deterioration in high pressure spool.

In FIG. 11, it can be seen that the fuzzy logic output is a close proxy to the development of high pressure spool efficiency that led to engine removal for high pressure turbine deterioration. As FIG. 11 shows, the numerical output of the fuzzy logic system continues to rise as the failure progresses.

The results interpretation that is used is based on a threshold of maintaining a level of about 0.75 over M flights to indicate that damage is occurring. The prediction has to hold for M flight samples to further mitigate data outliers and noise. This threshold in combination with the slope of the fuzzy logic system output and the EGT margin can be further processed to obtain the approximate time-to-failure and the extent of engine deterioration. In the example illustrated in FIG. 11, the fuzzy logic output indicated that high pressure spool deterioration began developing at an accelerated rate about two months prior to the failure. Thus, a fuzzy logic fault detection system would have been able to detect the high pressure spool deterioration in time to allow the aircraft operator ample time to schedule testing and removal of the engine.

Figure 12:
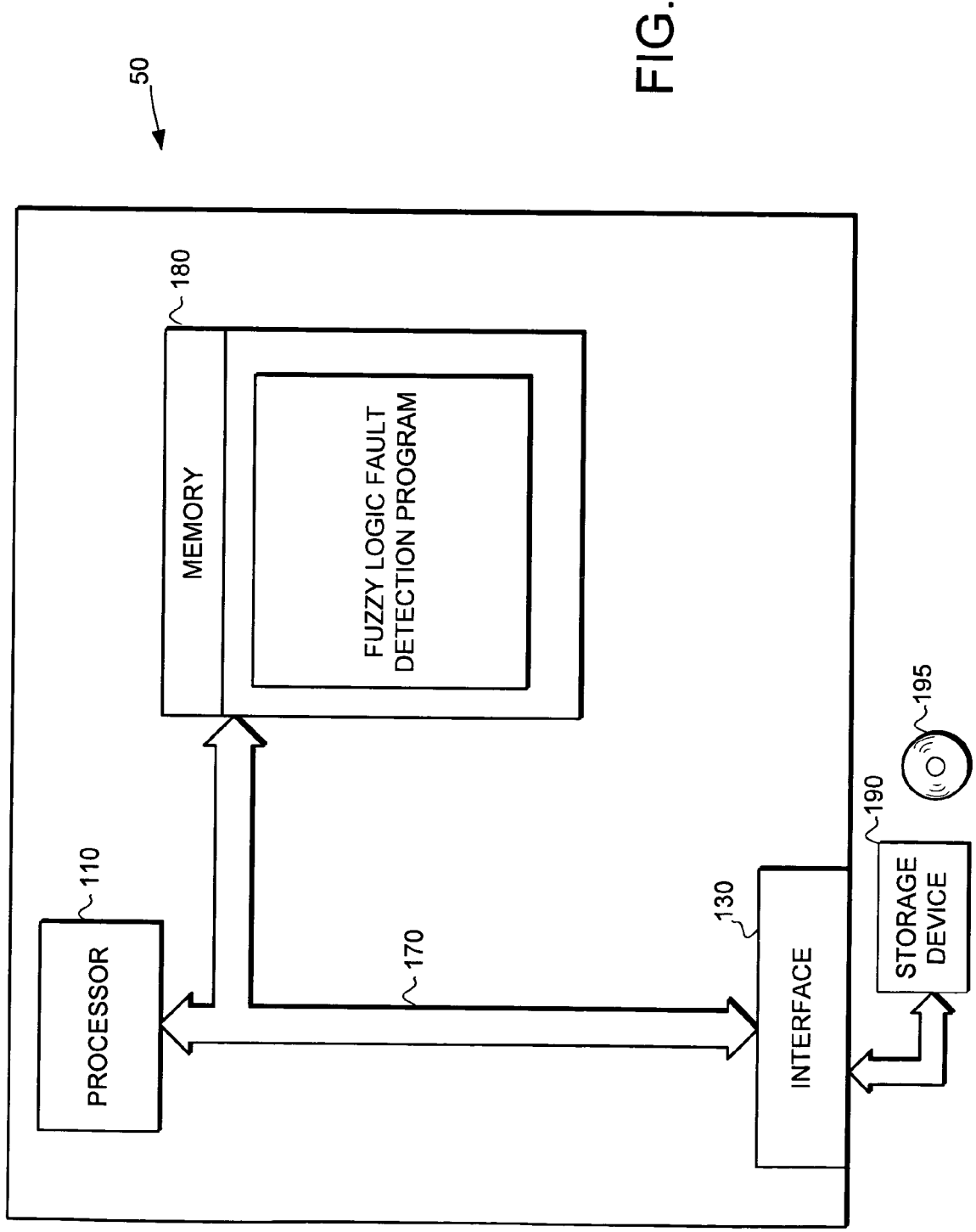
FIG. 12 is a schematic view of an exemplary computer system implementing a fuzzy logic fault detection system.

The fuzzy logic fault detection system and method can be implemented in wide variety of platforms. Turning now to FIG. 12, an exemplary computer system 50 is illustrated. Computer system 50 illustrates the general features of a computer system that can be used to implement the invention. Of course, these features are merely exemplary, and it should be understood that the invention can be implemented using different types of hardware that can include more or different features. It should be noted that the computer system can be implemented in many different environments, such as onboard an aircraft to provide onboard diagnostics, or on the ground to provide remote diagnostics. The exemplary computer system 50 includes a processor 110, an interface 130, a storage device 190, a bus 170 and a memory 180. In accordance with the preferred embodiments of the invention, the memory system 50 includes a fuzzy logic fault detection program, which includes a sensor data processor program and a fuzzy logic inference system program.

The processor 110 performs the computation and control functions of the system 50. The processor 110 may comprise any type of processor, include single integrated circuits such as a microprocessor, or may comprise any suitable number of integrated circuit devices and/or circuit boards working in cooperation to accomplish the functions of a processing unit. In addition, processor 110 may comprise multiple processors implemented on separate systems. In addition, the processor 110 may be part of an overall vehicle control, navigation, avionics, communication or diagnostic system. During operation, the processor 110 executes the programs contained within memory 180 and as such, controls the general operation of the computer system 50.

Memory 180 can be any type of suitable memory. This would include the various types of dynamic random access memory (DRAM) such as SDRAM, the various types of static RAM (SRAM), and the various types of non-volatile memory (PROM, EPROM, and flash). It should be understood that memory 180 may be a single type of memory component, or it may be composed of many different types of memory components. In addition, the memory 180 and the processor 110 may be distributed across several different computers that collectively comprise system 50. For example, a portion of memory 180 may reside on the vehicle system computer, and another portion may reside on a ground based diagnostic computer.

The bus 170 serves to transmit programs, data, status and other information or signals between the various components of system 100. The bus 170 can be any suitable physical or logical means of connecting computer systems and components. This includes, but is not limited to, direct hard-wired connections, fiber optics, infrared and wireless bus technologies.

The interface 130 allows communication to the system 50, and can be implemented using any suitable method and apparatus. It can include a network interfaces to communicate to other systems, terminal interfaces to communicate with technicians, and storage interfaces to connect to storage apparatuses such as storage device 190. Storage device 190 can be any suitable type of storage apparatus, including direct access storage devices such as hard disk drives, flash systems, floppy disk drives and optical disk drives. As shown in FIG. 12, storage device 190 can comprise a disc drive device that uses discs 195 to store data.

In accordance with the preferred embodiments of the invention, the computer system 50 includes the fuzzy logic fault detection program. Specifically during operation, the fuzzy logic detection program is stored in memory 180 and executed by processor 110. When being executed by the processor 110, the fuzzy logic fault detection program monitors turbine engine sensor data to identify potential faults in the engine.

It should be understood that while the present invention is described here in the context of a fully functioning computer system, those skilled in the art will recognize that the mechanisms of the present invention are capable of being distributed as a program product in a variety of forms, and that the present invention applies equally regardless of the particular type of signal bearing media used to carry out the distribution. Examples of signal bearing media include: recordable media such as floppy disks, hard drives, memory cards and optical disks (e.g., disk 195), and transmission media such as digital and analog communication links, including wireless communication links.

It should also be understood that while the present invention has been described as a fault detection system for detecting turbine engine faults, that the present invention can also be applied to other aircraft systems. Examples of the types of aircraft systems that the present invention can be applied to include environmental control systems, aircraft hydraulic systems, aircraft fuel delivery systems, lubrication systems, engine starter systems, aircraft landing systems, flight control systems and nuclear, biological, chemical (NBC) detection systems.

The present invention thus provides a fault detection system and method that provides improved performance over previous techniques. The fault detection system provides the ability to detect symptoms of engine faults based on a relatively limited number of engine parameters that are sampled relatively infrequently. The fault detection system includes a sensor data processor that receives engine sensor data during operation and augments the sensor data. The augmented data set is passed to a fuzzy logic inference system that determines the likelihood that a fault as occurred. Detected faults can then be passed to a diagnostic system where they can be further evaluated.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

The invention claimed is:

1. A fault detection system for detecting faults in a turbine engine, the fault detection system comprising:

a sensor data processor, the sensor data processor configured to receive sensor data from the turbine engine and determine a difference between the sensor data and expected values of the sensor data to generate residuals from the sensor data and determine a rate of change of the residuals, the residuals from the sensor data and the rate of change of the residuals providing an augmented data set; and a fuzzy logic inference system, the fuzzy logic inference system configured to receive the augmented data set, and wherein the fuzzy logic inference system includes a plurality of membership functions and wherein each of the plurality of membership functions is associated with at least one data type in the residuals from the sensor data and the rate of change of the residuals, and wherein the fuzzy logic system is configured to fuzzify the residuals from the sensor data and the rate of change of the residuals using the plurality of membership functions and analyze the residuals from the sensor data and the rate of change of the residuals to determine a likelihood that a fault has occurred in the turbine engine.

2. The system of claim 1 wherein the sensor data processor is further configured to compute a margin for the sensor data.

3. The system of claim 1 wherein the sensor data comprises engine speed data, fuel flow data and exhaust gas temperature data.

4. The system of claim 1 wherein the sensor data processor is configured to receive exhaust gas temperature data and wherein the sensor data processor is further configured to determine exhaust gas temperature margin data corresponding to a difference between the exhaust gas temperature data and a maximum safe temperature.

5. The system of claim 1 wherein the fuzzy logic inference system includes a plurality of rules, and wherein the fuzzy logic system is configured to evaluate the fuzzified residuals from the sensor data and the rate of change of the residuals according to the plurality of rules.

6. The system of claim 5 wherein the fuzzy logic inference system is further configured to aggregate outputs of the plurality of rules and defuzzify the aggregated output for input into a diagnostic system.

7. The system of claim 6 wherein the sensor data comprises exhaust gas temperature data, engine speed data, and fuel flow data, and wherein the sensor data processor is configured to generate residuals from the exhaust gas temperature data, engine speed data, and fuel flow data, and wherein the sensor data processor is configured to determine a rate of change of the residuals from the exhaust gas temperature data, engine speed data, and fuel flow data, and wherein the sensor data processor is configured to determine a margin for the exhaust gas temperature data corresponding to a difference between the exhaust gas temperature data and a maximum safe exhaust gas temperature for the turbine engine.

8. An apparatus comprising:
a) a processor;
b) a memory coupled to the processor;
c) a fault detection program residing in memory and being executed by the processor, the fault detection program including:
i) a sensor data processing program, the sensor data processing program configured to receive sensor data from a turbine engine and determine a difference between the sensor data and expected values of the sensor data to generate residuals from the sensor data and determine a rate of change of the residuals, the residuals from the sensor data and the rate of change of the residuals providing an augmented data set; and ii) a fuzzy logic inference program, the fUzzy logic inference program configured to receive the augmented data set, and wherein the fuzzy logic inference program includes a plurality of membership functions and wherein each of the plurality of membership functions is associated with at least one data type in the residuals from the sensor data and the rate of change of the residuals, and wherein the fuzzy logic program is configured to fuzzify the residuals from the sensor data and the rate of change of the residuals using the plurality of membership functions and analyze the residuals from the sensor data and the rate of change of the residuals to determine a likelihood that a fault has occurred.

9. The apparatus of claim 8 wherein the sensor data comprises engine speed data, fuel flow data and exhaust gas temperature data.

10. The apparatus of claim 8 wherein the sensor data processing program is configured to receive exhaust gas temperature data and wherein the sensor data processor is further configured to determine exhaust gas temperature margin data corresponding to a difference between the exhaust gas temperature data and a selected maximum safe exhaust gas temperature for the turbine engine.

11. The apparatus of claim 8 wherein the fuzzy logic inference program includes a plurality of rules, and wherein the fUzzy logic system is configured to evaluate the fuzzified residuals from the sensor data and the rate of change of the residuals according to the plurality of rules.

12. The apparatus of claim 11 wherein the fuzzy logic inference program is further configured to aggregate outputs of the plurality of rules and defuzzify the aggregated output for input into a diagnostic system.

13. The apparatus of claim 8 wherein the sensor data comprises exhaust gas temperature data, engine speed data, and fuel flow data, and wherein the sensor data processing program is configured to generate residuals from the exhaust gas temperature data, engine speed data, and fuel flow data, and wherein the sensor data processing program is configured to determine a rate of change of the residuals from the exhaust gas temperature data, engine speed data, and fuel flow data, and wherein the sensor data processing program is configured to determine a margin for the exhaust gas temperature data corresponding to a difference between the exhaust gas temperature data and a maximum safe exhaust gas temperature for the turbine engine.

14. A fault detection system for detecting faults in a turbine engine, the fault detection system comprising:
a sensor data processor, the sensor data processor configured to:
receive sensor data from the turbine engine, the sensor data including exhaust gas temperature data, engine speed data, and fuel flow data;
generate exhaust gas temperature residuals by determining differences between the exhaust gas temperature data to expected values of exhaust gas temperature;
generate engine speed residuals by determining differences between the engine speed data to expected values of engine speed;
generate fuel flow residuals by determining differences between the fuel flow data and expected values of fuel flow;
determine a rate of change of the exhaust gas temperature residuals;
determine a rate of change of the engine speed residuals;
determine a rate of change of the fuel flow residuals; and a fuzzy logic inference system, the fuzzy logic inference system configured to receive the exhaust gas temperature residuals, the engine speed residuals, the fuel flow residuals, the rate of change of the exhaust gas temperature residuals, the rate of change of the engine speed residuals, and the rate of change of the fuel flow residuals, and wherein the fuzzy logic inference system includes a plurality of membership functions, and wherein the fuzzy logic system is configured to fuzzify the exhaust gas temperature residuals, the engine speed residuals, the fuel flow residuals, the rate of change of the exhaust gas temperature residuals, the rate of change of the engine speed residuals, and the rate of change of the fuel flow residuals using the plurality of membership functions to determine a likelihood that a fault has occurred in the turbine engine.

15. The system of claim 14 wherein the plurality of membership functions include a low membership function, a medium membership function, and a high membership function.

16. The system of claim 15 wherein the low membership function comprises a first sigmoid function, and wherein the medium membership function comprises a trapezoid function, and wherein the high membership function comprises a second sigmoid function.

17. The system of claim 15 wherein the fuzzy logic inference system is configured to fuzzify the exhaust gas temperature residuals, the engine speed residuals, the fuel flow residuals, the rate of change of the exhaust gas temperature residuals, the rate of change of the engine speed residuals, and the rate of change of the fuel flow residuals using the plurality of membership functions by generating an aggregated output function from the plurality of membership functions.

18. The system of claim 17 wherein the fuzzy logic inference system is configured to determine a likelihood that a fault has occurred in the turbine engine by determining a centroid of area under the aggregated output function.

19. The system of claim 18 wherein the fault comprises a high pressure spool fault.

20. The system of claim 14 wherein the sensor data processor is configured to determine the rate of change of the exhaust gas temperature residuals using a linear fit of the exhaust gas temperature residuals, and wherein the sensor data processor is configured to determine the rate of change of the engine speed residuals using a linear fit of the engine speed residuals, and wherein the sensor data processor is configured to determine the rate of change of the fuel flow residuals using a linear fit of the fuel flow residuals.

* * * * *